US00RE34252E

United States Patent [19]

Pien

[11] E Patent Number: Re. 34,252

[45] Reissued Date of Patent: May 18, 1993

[54] MULTI-FUEL COMPRESSION-IGNITION ENGINE AND FUEL INJECTION PUMP THEREFOR

[76] Inventor: Pao C. Pien, 1105 Marbelle Club, 840 S. Collier Blvd., Marco Island, Fla. 33937

[21] Appl. No.: 813,827

[22] Filed: Dec. 27, 1991

Related U.S. Patent Documents

Reissue of:

[64] Patent No.: 5,024,195
Issued: Jun. 18, 1991
Appl. No.: 536,016
Filed: Jun. 7, 1990

[51] Int. Cl.[5] ..... F02D 19/08

[52] U.S. Cl. ..... 123/304; 123/575

[58] Field of Search ..... 123/299, 300, 304, 445, 123/451, 575, 576, 577, 578; 417/493

[56] References Cited

U.S. PATENT DOCUMENTS

| | | | |
|---|---|---|---|
| 2,319,858 | 5/1943 | Grow | 123/304 X |
| 2,440,196 | 4/1948 | Fenney | 417/494 |
| 2,741,230 | 4/1956 | Reynolds | 123/304 |
| 2,968,298 | 1/1961 | Meurer | 123/445 |
| 3,749,097 | 7/1973 | Grow | 123/304 |
| 4,554,903 | 11/1985 | Straubel et al. | 123/575 |

FOREIGN PATENT DOCUMENTS

| | | |
|---|---|---|
| 0307808 | 6/1973 | Austria . |
| 0875103 | 4/1953 | Fed. Rep. of Germany . |
| 1062489 | 7/1959 | Fed. Rep. of Germany . |
| 58-170848 | 10/1983 | Japan . |
| 2136885 | 9/1984 | United Kingdom . |

*Primary Examiner*—Willis R. Wolfe
*Attorney, Agent, or Firm*—Roy W. Butrum

[57] ABSTRACT

A primary low viscosity fuel and a secondary high viscosity fuel are fed to an injection pump including a plunger which reciprocates and rotates within a bore in a pump housing. The upper end of the plunger defines with the upper end of the bore a mixing chamber. The mixing chamber is connected through a check valve with a fuel injector for injecting mixed fuel into the combustion chamber of an engine. The plunger has a helical groove thereon which is in communication with the mixing chamber. Primary fuel is fed directly into the mixing chamber. The secondary fuel is fed into an annular groove which is in communication with the mixing chamber through a passage formed in the plunger. The high viscosity secondary fuel in the annular groove forms a seal between the plunger and the wall of the bore to prevent the low viscosity primary fuel from leaking past the seal.

22 Claims, 2 Drawing Sheets

160
150
156
158
144
142
152
154
140
78
70
44'
100
10'
14'
24'
22'
74'
62'
112
32'
34'
134
132
130
124
122
120
110
70'
74'
72'
50'
52'
40'
49'
104
46'
100
102
56'
60'
62'
48'
44'
112

MULTI-FUEL COMPRESSION-IGNITION ENGINE AND FUEL INJECTION PUMP THEREFOR

Matter enclosed in heavy brackets [ ] appears in the original patent but forms no part of this reissue specification; matter printed in italics indicates the additions made by reissue.

BACKGROUND OF THE INVENTION invention relates to a compression-ignition internal combustion engine which is adapted to operate with a plurality of fuels, and a novel fuel injection pump means is provided which enables the fuels to be selectively mixed with one another during certain periods of operation of the engine.

In view of present environmental concerns, it has been proposed that internal combustion engines of the future should utilize fuels other than fossil fuels in order to reduce pollutants in the air. Furthermore, such engines would also reduce dependence on imported oil. It has been suggested that alcohol would be a good substitute for fossil fuels since the resources for production of alcohol are readily available. However, the use of a fuel such as alcohol presents certain practical problems such as difficulty in starting an engine, and accordingly, compression-ignition engines have been designed for use with different fuels or with a combination of different fuels. Multi-fuel engines have been developed for use by the military which will operate on various high octane fuels. These engines use very high compression ratios in excess of twenty in order to shorten the delay period of combustion of fuels having poor ignition qualities.

Multi-fuel compression-ignition engines have been designed for buses wherein diesel oil is used mainly for starting the engine and during light load operation, while alcohol is used as the primary fuel after a warm up period. The engine employs a first fuel injection system for the diesel oil and a second independent fuel injection system for the alcohol.

A compression-ignition engine has also been developed including a dual fuel injection system wherein a diesel engine was modified so that alcohol is mixed with the diesel fuel, and up to fifty percent of the diesel fuel could be replaced by alcohol. The injection system was designed so that the relatively low viscosity alcohol is mixed with the diesel oil downstream of the fuel injection pump, whereby the alcohol does not flow through the fuel injection pump.

Fuel injection pumps have long employed a conventional construction known as the BOSCH pump which includes a plunger which reciprocates within a bore formed in a housing. The plunger has a very small tolerance with respect to the bore, and this tight fit is employed to form a seal which prevents escape of the fuel past the plunger when the fuel is under high pressure. This arrangement works effectively with a fuel such as diesel oil which has a relatively high viscosity. However, if a fuel of much lower viscosity such as alcohol passes through the pump, leakage of fuel past the plunger becomes a serious problem. The minimal clearance between the plunger and bore is very expensive to manufacture, and an effective seal is not attainable as a practical matter when dealing with very low viscosity fuels.

Prior art compression-ignition engines have required a fuel with a high cetane number. Additives have been blended into fuels to raise the cetane number. Accordingly, it has been expensive to provide fuels with adequately high cetane number to effectively operate in compression-ignition engines.

It is accordingly a desirable objective to provide a multi-fuel compression-ignition engine which can be utilized in automotive applications and which efficiently operates on fuels with relatively low cetane numbers.

SUMMARY OF THE INVENTION

The present invention eliminates the necessity of blending additives into fuels in order to raise the cetane number thereof. This is accomplished by providing a secondary fuel with a high cetane number which is mixed with the primary fuel in the fuel injection pump just before the fuel is discharged from the pump. The pump is provided with a mixing chamber which causes the primary and secondary fuels to be mixed to provide a mixture while the two fuels retain their inherent qualities. In other words, the fuels are mixed, but not blended together.

In a typical example, the primary fuel may be alcohol, and the secondary fuel may be diesel oil. The diesel oil has high ignition qualities whereas the alcohol has much lower ignition qualities. When the mixed fuels pass through an injection nozzle into the combustion chamber of a cylinder of the engine, the diesel oil becomes numerous minute particles distributed throughout the combustion chamber and which serve as igniters so that combustion can be started with a very short delay period. It should be understood that other fuels may be employed for the primary and secondary fuels, and accordingly, the primary fuel may also be kerosene or gasoline and the like. In most instances, the secondary fuel will be diesel oil because of its ready availability. In any event, the secondary fuel should have a substantially greater viscosity than the primary fuel.

The secondary fuel is injected into the combustion chamber of the engine mainly during starting of the engine and initial warm up. After the engine has reached a high operating temperature, the engine operates mainly, if not entirely, on the primary fuel. The engine is provided with suitable sensors and a control means for controlling the amounts of primary and secondary fuel which is mixed in the fuel injection pump.

The conventional BOSCH fuel pump has been modified in a unique manner which permits the mixing of the primary and secondary fuels within a mixing chamber defined in the pump; and a seal is provided which prevents undue leakage of the low viscosity primary fuel past the plunger of the pump. The seal is accomplished by providing an annular groove in the plunger which is filled with the high viscosity secondary fuel during operation of the pump. This annular band of high viscosity secondary fuel forms a seal between the plunger and the bore which effectively prevents the low viscosity primary fuel from leaking past the plunger. The novel construction of the injection fuel pump according to the invention may be accomplished b making minor modifications to the housing and plunger of a conventional BOSCH pump, whereby the invention provides an economical structure for accomplishing the desired end results. Furthermore, for any particular low viscosity primary fuel, the allowable clearance between the plunger and its bore in the present invention may be greater than that of a conventional fuel injection pump, thereby reducing the manufacturing cost of the pump.

In the present invention, the compression ratio of the engine can be determined by considerations of cycle efficiency and engine weight, while smooth engine operation is achieved by an utilizing an appropriate secondary fuel.

When straight run petroleum products are used as the primary fuels, there will no longer be a need for high octane gasolines, thereby eliminating the need for subjecting petroleum to a cracking process to convert from low to high octane products. This will result in a great saving in equipment, labor and waste involved in a conventional cracking process.

DESCRIPTION OF THE PRIOR ART

Figure 1:
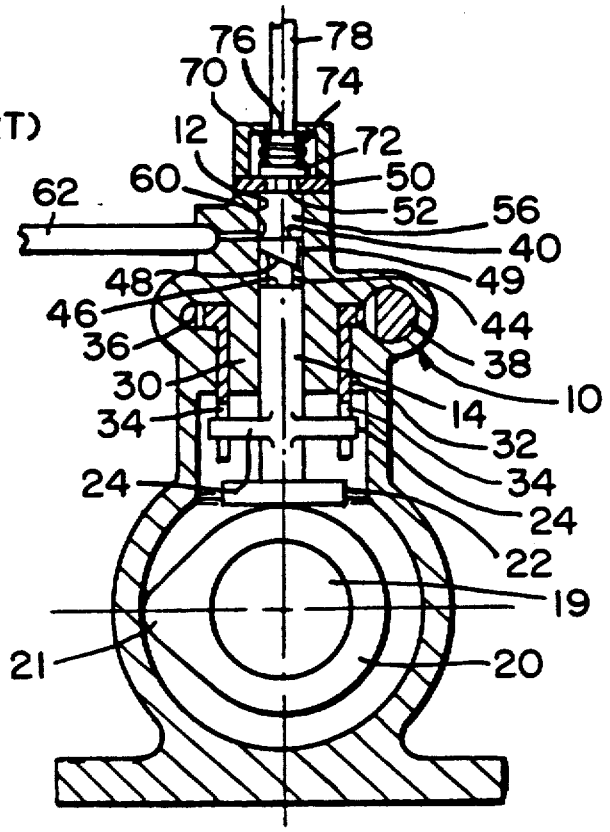
FIG. 1 (PRIOR ART)
FIG. 1 is a vertical cross-sectional view through a prior art fuel injection pump.

Referring now to the drawings wherein like reference characters designate corresponding parts throughout the several views, there is shown in FIG. 1 a conventional prior art BOSCH fuel injection pump. A body means 10 has a bore 12 formed therein. Elongated plunger means 14 is mounted for reciprocation and rotation within the bore. The outer surface of the plunger means has a tight fit within the bore in the body means, and this tight fit is relied upon to provide a seal to prevent leakage of fuel past the plunger means in a downward direction as seen in the drawings. Cam means 20 is mounted on shaft 19 and rotates in synchronism with a cam shaft which operates the inlet and outlet valves associated with a cylinder of the engine in a well-known manner. This ensures that fuel will be fed at proper times under high pressure to a fuel injection means and thence into the combustion chamber of a cylinder.

Cam means 20 engages a follower portion 22 disposed at the bottom of the plunger means to cause reciprocation of the plunger means within the bore. A pair of integral arms 24 extend radially outwardly of the plunger means. The body means includes a cylindrical portion 30, and a cylindrical sleeve 32 mounted for rotation around portion 30. The sleeve has a pair of diametrically opposite slots 34 which extend parallel with the longitudinal axis of the plunger means. Arms 24 on the plunger means are snugly received within the slots so that the plunger means can freely reciprocate with respect to the sleeve, but is constrained to rotate therewith.

Circumferentially extending gear teeth 36 are provided at the upper end of the sleeve, and these gear teeth mesh with a rack member 38 so that longitudinal movement of the rack into or out of the plane of the paper will cause rotation of the sleeve. Rack member 38 may be operated in a known manner so as to vary the effective stroke of the plunger means of the pump.

The plunger means includes an upper end surface 40, and a helical groove 44, formed around the outer periphery of the plunger means, is spaced from the end surface. This helical groove is defined between a lower edge 46 which extends substantially circumferentially around the plunger means and an upper edge 48 which defines a portion of a helix. A longitudinally extending groove 49 provides communication between the helical groove and the end surface 40.

The upper end of the bore 12 in the body means is closed off by an end wall 50 having an outlet port means 52 formed therethrough. A chamber 56 is defined within the bore in the body means and between the end wall 50 and the upper end surface 40 of the plunger means. An inlet port means 60 in the body means is adapted to be in communication with chamber 56 and is connected by a conduit 62 with a suitable source of fuel which is provided under low pressure from a conventional fuel pump.

FIG. 1 illustrates the plunger means in its lower limit of travel wherein inlet port means 60 is in communication with chamber 56. When cam means 20 rotates so that the lobe 21 formed thereon engages follower 22, plunger means 14 initially moves upwardly to shut off communication between inlet port means 60 and chamber 56. As the plunger means moves further upwardly, the pressure of the fuel within chamber 56 builds up. It is noted that fluid from the chamber can pass through groove 49 into helical groove 44.

When helical groove 44 comes into communication with inlet port means 60 as the plunger means moves upwardly, the fuel under high pressure within the helical groove can pass back through inlet port means 60 and into conduit 62. A suitable by-pass valve (not shown) may be connected in the conduit 62 to allow the fuel flowing back into the conduit from the helical groove to return to the source of fuel.

It is apparent that by operating rack member 38 so as to rotate sleeve 32, the plunger means may be rotated within bore 12 while the plunger means is reciprocating in response to rotation of the cam means 20. As the plunger means rotates, different portions of the upper edge of the helical groove will be aligned with the inlet port means 60, so that the plunger means will move different distances in an axial direction before the helical groove comes into communication with the inlet port means, thereby varying the effective stroke of the plunger means. It is apparent that once the helical groove is in communication with the inlet port means, the fuel within chamber 56 can then flow back into conduit 62.

A small housing 70 is mounted on end wall 50 and houses a one-way check valve means including a disc-like valve member 72 for closing off the outlet means 52. The valve member is biased into closed position by a coil spring 74. The oulet means is normally closed off by the valve means under the influence of the coil spring. When the plunger means moves upwardly, the high pressure generated within chamber 56 causes the valve member to move upwardly against the force of the spring, and high pressure fuel flows past the valve member and through an outlet opening 76 in housing 70 into a fuel line 78 which leads to the fuel injection means of a cylinder of the engine as hereinafter described.

DESCRIPTION OF THE PREFERRED EMBODIMENT

Figure 2:
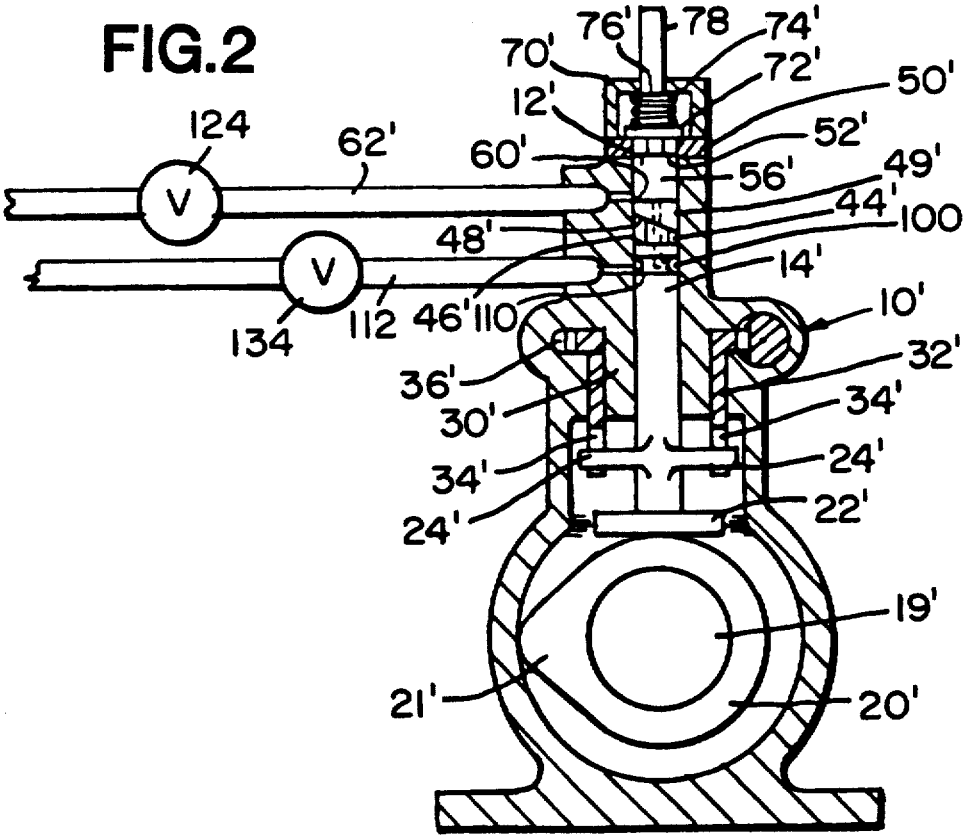
FIG. 2 is a vertical cross-sectional view through a fuel injection pump according to the present invention.
Figures 3, 4:
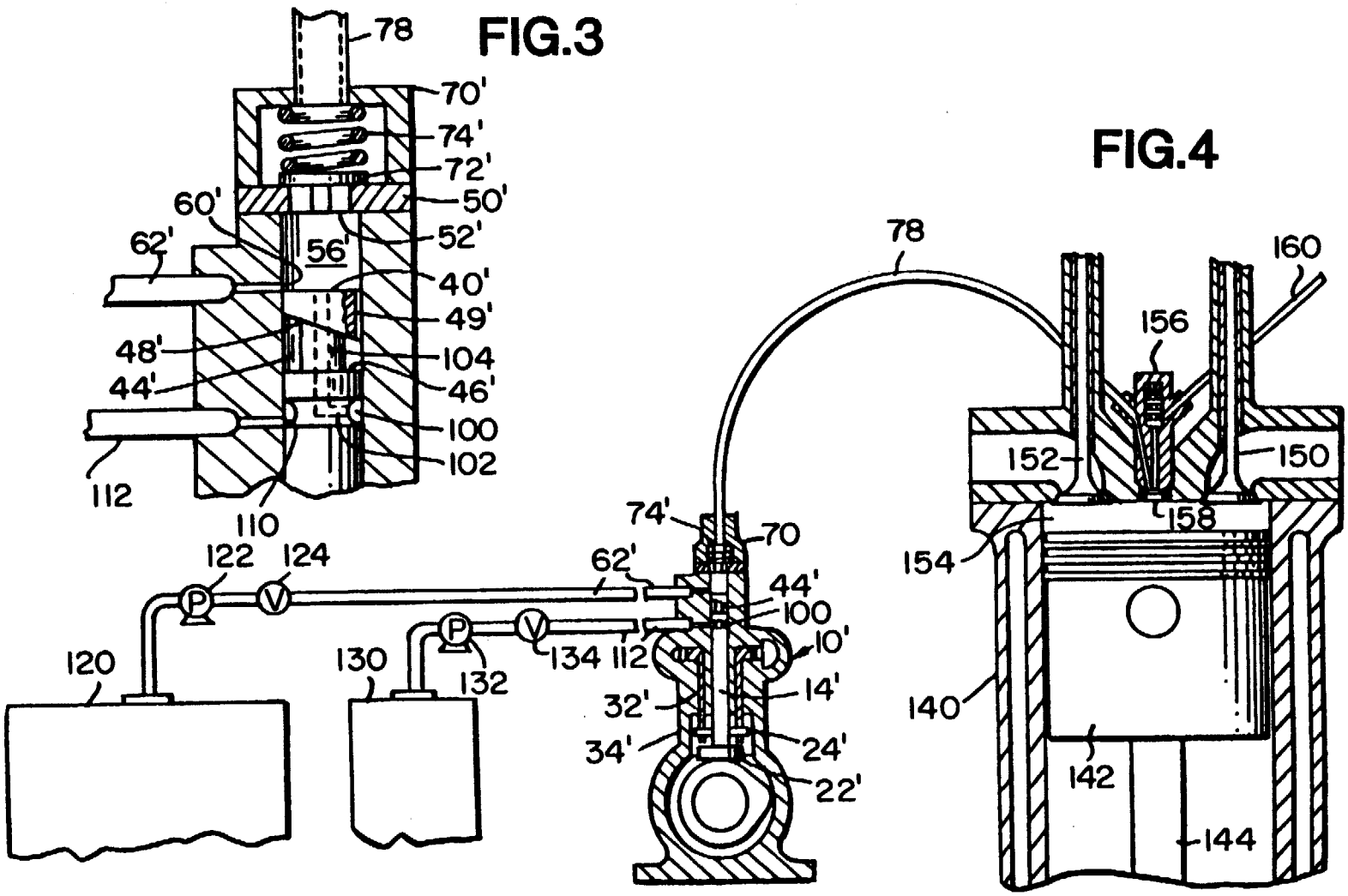
FIG. 3 is an enlarged view of a portion of the structure shown in FIG. 2.
FIG. 4 is a somewhat schematic view, partly in section, illustrating portions of a compression-ignition internal combustion engine according to the present invention.

Referring now to FIGS. 2 and 3 of the drawings, a modified fuel injection pump according to the present invention is shown wherein parts similar to the pump shown in FIG. 1 are given the same reference numerals primed. The plunger means is modified to include an annular groove or recess 100 extending circumferentially around the plunger means. Passage means formed within the plunger provides communication between the annular groove and the chamber 56', and includes a radial portion 102 which joins with a longitudinal portion 104. The passage means includes opposite ends, the outer end of radial portion 102 opening into, the annular groove, and the upper end of longitudinal portion 104 opening into chamber 56' at the upper end surface 40' of the plunger means. The body means is provided with a second inlet port means 110 which is in communication with conduit 112.

As seen in FIG. 4, conduit 62' is connected with a source of primary fuel in the form of a conventional fuel tank 120. A conventional low pressure fuel pump 122 is connected in conduit 62' for pumping fuel from the primary fuel tank into the high pressure fuel injection pump. A control valve 124 is connected in conduit 62' for controlling the flow of primary fuel to the fuel injection pump.

Conduit 112 is connected with a source of secondary fuel in the form of a conventional fuel tank 130 which has a much smaller capacity than tank 120 since the amount of secondary fuel consumed by the engine is ordinarily much smaller than the amount of primary fuel consumed. A conventional low pressure fuel pump 132 is connected in conduit 112 for pumping fuel from the secondary fuel tank into the high pressure fuel injection pump. A control valve 134 is connected in conduit 112 for controlling the flow of secondary fuel to the fuel injection pump.

The remaining components of the engine are of conventional construction, and a typical cylinder 140 has a piston 142 reciprocably mounted therein, the usual connecting rod 144 being connected to the piston. Conventional inlet and outlet valves 150 and 152 are in communication with the combustion chamber 154 defined above the piston. A conventional fuel injection means 156 in the form of an injection nozzle is supported in position so that the outlet 158 thereof is in communication with the combustion chamber to provide fuel under high pressure to the combustion chamber. The fuel injection means is connected to fuel line 78 to receive fuel under high pressure from the fuel injection pump. A conduit 160 is provided to carry off any leakage of fuel from the injection nozzle.

OPERATION

In a typical example, the primary fuel may comprise alcohol, and the secondary fuel may comprises diesel fuel. The control valves 124 and 134 are controlled by suitable sensors (not shown) which may comprises temperature sensors supported at a cylinder for measuring the temperature of the cylinder. These sensors are connected in a suitable electronic circuit for adjusting the relative positions of valves 124 and 134 for a particular cylinder temperature so as to adjust the proportion of the fuels in the mixture. It is of course apparent that the invention can be utilized with either a single cylinder or multi-cylinder engine, and accordingly, the following description is equally applicable to each cylinder of a multi-cylinder engine.

When the engine is started, the cylinder will be relatively cold, and the sensors will adjust the control valves so that a maximum amount of secondary fuel is introduced into the mixture. The amount of secondary fuel must be sufficient to cause ready combustion of the mixture when the cylinder is relatively cold. As the temperature increases in the cylinder, the valves are automatically adjusted so that the amount of secondary fuel decreases in proportion to the total mixture. When the cylinder reaches a high temperature after running the engine for a while, a maximum amount of primary fuel and a minimum amount of secondary fuel are provided to the combustion chamber.

It will be noted that in the invention, chamber 56' becomes a mixing chamber wherein the primary and secondary fuels are mixed with one another. The cross-sectional area of the mixing chamber is much greater than the cross-sectional area of the inlet means 60' and the passage means 102, 104 through the plunger means, thereby ensuring that the fuels will be mixed together, while at the same time the fuels are not blended together.

The diesel oil fuel disposed within annular groove 100 forms a seal between the bore and the plunger means. Diesel oil has a viscosity much higher than that of alcohol. If any of the alcohol leaks from the helical groove downwardly as seen in the drawings, it will come in contact with the viscous diesel fuel in groove 100. The diesel fuel will prevent the alcohol from leaking past the seal, thereby solving the sealing problem that has been prevalent in prior art fuel injection pumps.

The invention has been described with reference to a preferred embodiment. Obviously, modifications, alterations and other embodiments will occur to others upon reading and understanding this specification. It is my intention to include all such modifications, alterations and alternate embodiments insofar as they come within the scope of the appended claims or the equivalent thereof.

What is claimed is:

1. A multi-fuel compression-ignition internal combustion engine comprising a first source of primary fuel, a second source of secondary fuel, injection pump means including a body means having a bore therein, plunger means movably mounted within said bore, said plunger means having an end portion defining with a portion of said bore a mixing chamber *in the interior of said bore*, first supply means *including first inlet port means opening into the interior of said bore* for supplying primary fuel from said first source to said mixing chamber, second supply means *including second inlet port means opening into the interior of said bore* for supplying secondary fuel from said second source to said mixing chamber so that said primary and secondary fuels are mixed in said mixing chamber to provide a mixture of the primary and secondary fuels, said second supply means including means spaced from said end portion in a direction away from said mixing chamber for providing a seal between said bore and said plunger means to prevent leakage of primary fuel past the seal, valve means permitting flow of fuel from said mixing chamber but substantially preventing flow of fuel back into said mixing chamber, a cylinder having a piston reciprocably mounted therein and defining with said cylinder a combustion chamber, fuel injection means for injecting fuel into said combustion chamber, and means connecting said fuel injection means with said valve means so that said injection pump means provides fuel under high pressure to said fuel injection means.

2. An engine as defined in claim 1 including control means for controlling the amounts of primary and secondary fuel supplied to said mixing chamber dependent on conditions within said combustion chamber.

3. An engine as defined in claim 2 wherein said control means comprises first valve means for controlling the flow of primary fuel and second valve means for controlling the flow of secondary fuel.

4. An engine as defined in claim 1 wherein [said first supply means includes inlet means formed in said body means and adapted to be in communication with said mixing chamber, ] said plunger means [having] *has* a helical groove formed thereon and being spaced from said end portion, means providing communication between said helical groove and said mixing chamber, and means for reciprocating and rotating said plunger means within said bore.

5. A multi-fuel compression-ignition internal combustion engine comprising a first source of primary fuel, a second source of secondary fuel, injection pump means having a mixing chamber, first supply means for supplying primary fuel from said first source to said mixing chamber, second supply means for supplying secondary fuel from said second source to said mixing chamber so that said primary and secondary fuels are mixed in said mixing chamber to provide a mixture of the primary and secondary fuels, valve means permitting flow of fuel from said mixing chamber but substantially preventing flow of fuel back into said mixing chamber, a cylinder having a piston reciprocably mounted therein and defining with said cylinder a combustion chamber, fuel injection means for injecting fuel into said combustion chamber, and means connecting said fuel injection means with said valve means so that said injection pump means provides fuel under high pressure to said fuel injection means, said injection pump means including body means having a bore therein, plunger means mounted for reciprocation and rotation within said bore, said plunger means having an end portion, said end portion and a portion of said bore forming a mixing chamber within said body means, said second supply means including an annular groove formed on said plunger means, passage means providing *continuous* communication between said annular groove and said mixing chamber, and inlet means formed in said body means and adapted to be in communication with said annular groove, secondary fuel disposed in said annular groove providing a seal between said bore and said plunger means.

6. An engine as defined in claim 5 wherein said passage means is formed within said plunger means and extends between said annular groove and said end portion of the plunger means.

7. A multi-fuel compression-ignition internal combustion engine comprising a first source of primary fuel, a second source of secondary fuel, injection pump means having a mixing chamber, first supply means for supplying primary fuel from said first source to said mixing chamber, second supply means for supplying secondary fuel from said second source to said mixing chamber so that said primary and secondary fuels are mixed in said mixing chamber to provide a mixture of the primary and secondary fuels, valve means permitting flow of fuel from said mixing chamber but substantially preventing flow of fuel back into said mixing chamber, a cylinder having a piston reciprocally mounted therein and defining with said cylinder a combustion chamber, fuel injection means for injecting fuel into said combustion chamber, and means connecting said fuel injection means with said valve means so that said injection pump means provides fuel under high pressure to said fuel injection means, said injection pump means including body means having a bore therein, plunger means mounted for reciprocation and rotation within said bore, said plunger means having an end portion, said end portion and a portion of said bore forming a mixing chamber within said body means, said first supply means including first inlet means formed in said body means and adapted to be in communication with said mixing chamber, said plunger means having a helical groove formed thereon and being spaced from said end portion, means providing communication between said helical groove and said mixing chamber, and means for reciprocating and rotating said plunger means within said bore, said second supply means including an annular groove formed on said plunger, said annular groove being spaced from said helical groove, said helical groove being disposed between said annular groove and said mixing chamber, passage means providing *continuous* communication between said annular groove and said mixing chamber, and second inlet means formed in said body means and adapted to be in communication with said annular groove, secondary fuel disposed [and] *in* said annular groove *and being at the same fuel pressure as the fuel pressure in said helical groove thereby* providing a seal between said bore and said plunger means to prevent leakage of primary fuel from said helical groove past said seal.

8. A multi-fuel compression-ignition internal combustion engine comprising, a first source of primary fuel of relatively low viscosity, a second source of secondary fuel of substantially higher viscosity than that of said primary fuel, injection pump means including body means having a bore therein, plunger means reciprocably and rotatably disposed with said bore, means for reciprocating and rotating said plunger means, said body means including an outlet means, one-way valve means in communication with said outlet means, said plunger means having an end portion defining one end of a mixing chamber disposed *in the interior of said bore* between said end portion and said outlet means, first supply means *including first inlet port means opening into the interior of said bore* for supplying primary fuel from said first source to said mixing chamber, second supply means *including second inlet port means opening into the interior of said bore* for supplying secondary fuel from said second source to said mixing chamber so that said primary and secondary fuels are mixed in said mixing chamber to provide a mixture of the primary and secondary fuels, the secondary fuel in said second supply means forming a seal spaced from said end portion in a direction away from the mixing chamber between said plunger means and said bore to prevent primary fuel from leaking past said seal, a cylinder having a piston reciprocably mounted therein and defining with said cylinder a combustion chamber, fuel injection means for injecting fuel into said combustion chamber, and means connecting said fuel injection means with said one-way valve means so that said injection pump means provides fuel under high pressure to said fuel injection means.

9. An engine as defined in claim 8 including control means for controlling the amounts of primary and secondary fuels supplied to said mixing chamber dependent on conditions within said combustion chamber.

10. An engine as defined in claim 9 wherein said control means comprises first valve means for controlling the flow of primary fuel and second valve means for controlling the flow of secondary fuel.

11. An engine as defined in claim 8 wherein [said first supply means includes inlet means formed in said body means and adapted to be in communication with said mixing chamber] said plunger means [having] *has* a helical groove formed thereon and being spaced from said end portion, means providing communication between said helical groove and said mixing chamber, and means for reciprocating and rotating said plunger means within said bore.

12. A multi-fuel compression-ignition internal combustion engine comprising, a first source of primary fuel of relatively low viscosity, a second source of secondary fuel of substantially higher viscosity than that of said primary fuel, injection pump means including body means having a bore therein, plunger means reciprocably and rotatably disposed with said bore, means for reciprocating and rotating said plunger means, said body means including an outlet means, one-way valve means in communication with said outlet means, said plunger means having an end portion defining one end of a mixing chamber disposed between said end portion and said outlet means, first supply means for supplying primary fuel from said first source to said mixing chamber, second supply means for supplying secondary fuel from said second source of said mixing chamber so that said primary and secondary fuels are mixed in said mixing chamber to provide a mixture of the primary and secondary fuels, the secondary fuel in said second supply means forming a seal between said plunger means and said bore to prevent primary fuel from leaking past said seal, a cylinder having a piston reciprocably mounted therein and defining with said cylinder a combustion chamber, fuel injection means for injecting fuel into said combustion chamber, and means connecting said fuel injection means with said one-way valve means so that said injection pump means provides fuel under high pressure to said fuel injection means, said second supply means including an annular groove formed on said plunger means, passage means providing *continuous* communication between said annular groove and said mixing chamber, and inlet means formed in said body means and adapted to be in communication with said annular groove, secondary fuel disposed in said annular groove providing a seal between said bore and said plunger means.

13. An engine as defined in claim 12 wherein said passage means is formed within said plunger means and extends between said annular groove and said end portion of the plunger means.

14. A multi-fuel compression-ignition internal combustion engine comprising, a first source of primary fuel of relatively low viscosity, a second source of secondary fuel of substantially higher viscosity than that of said primary fuel, injection pump means including body means having a bore therein, plunger means reciprocably and rotatably disposed with said bore, means for reciprocating and rotating said plunger means, said body means including an outlet means, one-way valve means in communication with said outlet means, said plunger means having an end portion defining one end of a mixing chamber disposed between said end portion and said outlet means, first supply means for supplying primary fuel from said first source to said mixing chamber, second supply means for supplying secondary fuel from said second source to said mixing chamber so that said primary and secondary fuels are mixed in said mixing chamber to provide a mixture of the primary and secondary fuels, the secondary fuel in said second supply means forming a seal between said plunger means and said bore to prevent primary fuel from leaking past said seal, a cylinder having a piston reciprocably mounted therein and defining with said cylinder a combustion chamber, fuel injection means for injecting fuel into said combustion chamber, and means connecting said fuel injection means with said one-way valve means so that said injection pump means provides fuel under high pressure to said fuel injection means, said first supply means including first inlet means formed in said body means and adapted to be in communication with said mixing chamber, said plunger means having a helical groove formed thereon and being spaced from said end portion, means providing communication between said helical groove and said mixing chamber, means for reciprocating and rotating said plunger means within said bore, said second supply means including an annular groove formed on said plunger, passage means providing *continuous* communication between said annular groove and said mixing chamber, and second inlet means formed in said body means and adapted to be in communication with said annular groove providing a seal between said bore and said plunger means to prevent leakage of primary fuel from said helical groove past said seal.

15. A fuel injection pump for a multi-fuel compression-ignition internal combustion engine comprising, body means having a bore therein, plunger means reciprocably and rotatably disposed within said bore, said plunger means including an end portion defining one end of a mixing chamber *in the interior of said bore* within said body means, outlet means in communication with said mixing chamber, said plunger means having a helical groove spaced from said end portion and disposed around the periphery thereof, means providing communication between said mixing chamber and said helical groove, first supply means *including first inlet port means opening into the interior of said bore* for supplying a relatively low viscosity primary fuel to said mixing chamber, and second supply means *including second inlet port means opening into the interior of said bore* for supplying a relatively high viscosity secondary fuel to said mixing chamber, the secondary fuel in said second supply means forming a seal spaced from said end portion in a direction away from the mixing chamber between said plunger means and said bore to prevent leakage of primary fuel past the seal.

16. A fuel injection pump as defined in claim 15 including a one-way valve means in communication with said outlet means for permitting flow of fuel from said mixing chamber but substantially preventing flow of fuel back into said mixing chamber.

17. A fuel injection pump for a multi-fuel compression-ignition internal combustion engine comprising, body means having a bore therein, plunger means reciprocably disposed within said bore, said plunger means including an end portion defining one end of a mixing chamber within said body means, outlet means in communication with said mixing chamber, said plunger means having a helical groove spaced from said end portion and disposed around the periphery thereof, means providing communication between said mixing chamber and said helical groove, first supply means for supplying a relatively low viscosity primary fuel to said mixing chamber, and second supply means for supplying a relatively high viscosity secondary fuel to said mixing chamber, the secondary fuel in said second supply means forming a seal between said plunger means and said bore to prevent leakage of primary fuel past the seal, said second supply means including an annular recess on said plunger means, said recess being spaced from said helical groove in a direction away from said mixing chamber, and passage means providing *continuous* communication between said recess and said mixing chamber.

18. A fuel injection pump as defined in claim 17 wherein said passage means is formed within said plunger means and has opposite ends, one of said ends opening into said recess, and the other of said ends opening into said mixing chamber.

19. A fuel injection pump as defined in claim 17 wherein said first supply means comprises first inlet means in said body means adapted to communicate with said mixing chamber, said second supply means comprising second inlet means in said body means adapted to communicate with said annular recess.

20. A fuel injection pump for a multi-fuel compression-ignition internal combustion engine comprising, body means having a bore therein, plunger means reciprocably and rotatably disposed within said bore, said plunger means being reciprocable between opposite limit positions, said plunger means including an end portion defining one end of a mixing chamber within said body means, outlet means in communication with said mixing chamber, said plunger means having helical groove spaced from said end portion and disposed around the periphery thereof, means providing communication between said mixing chamber and said helical groove, said body means including first inlet means for receiving a relatively low viscosity primary fuel from a primary fuel source, said first inlet means being in communication with said mixing chamber when said plunger is in one of said limit positions, said plunger means having an annular groove thereon spaced from said helical groove, passage means providing *continuous* communication between said annular groove and said mixing chamber, said body means including second inlet means for receiving a relatively high viscosity secondary fuel from a secondary fuel source, said second inlet means being in communication with said annular groove when said plunger is in said one of its limit positions, the secondary fuel within said annular groove forming a seal between said plunger and said bore to prevent leakage of primary fuel past said seal.

21. A fuel injection pump as defined in claim 20 wherein said helical groove is disposed between said end portion and said annular groove.

22. A fuel injection pump as defined in claim 20 wherein said passage means is disposed within said plunger means and has opposite ends, one of said ends opening at said end portion of the plunger means, the other of said ends opening at said annular groove.

* * * * *